United States Patent [19]

Schielke

[11] Patent Number: 5,748,803
[45] Date of Patent: May 5, 1998

[54] METHOD AND APPARATUS FOR IMAGE VALUE CORRECTION IN OPTOELECTRONIC TRANSDUCERS

[75] Inventor: Rainer Schielke, Fleckeby, Germany

[73] Assignee: Linotype-Hell AG, Kiel, Germany

[21] Appl. No.: 590,813

[22] Filed: Jan. 24, 1996

[30]    Foreign Application Priority Data

Nov. 22, 1995 [DE] Germany .................... 195 43 488.9

[51] Int. Cl.$^6$ .................................................. H04N 1/40
[52] U.S. Cl. ....................... 382/275; 358/463; 348/247
[58] Field of Search ............................... 358/463, 474, 358/482–483; 382/274, 275; 348/246–251; H04N 1/40, 1/409

[56]           References Cited

U.S. PATENT DOCUMENTS

| | | |
|---|---|---|
| 4,920,428 | 4/1990 | Lin et al. . |
| 5,499,114 | 3/1996 | Compton .................... 358/483 |
| 5,514,865 | 5/1996 | O'Neil ........................ 358/474 |
| 5,654,755 | 8/1997 | Hosier ........................ 358/463 |

*Primary Examiner*—Kim Vu
*Attorney, Agent, or Firm*—Hill & Simpson

[57]               ABSTRACT

A method and apparatus for the correction of the image values of faulty sensors of an optoelectronic transducer comprising a plurality of sensor elements. In order to avoid errors at light/dark transitions in the scanned original, the erroneous image value of a faulty sensor element is fully corrected in areas of the original having nearly constant brightness values and is only slightly corrected in regions of light/dark transitions (contours) in the original. In order to achieve this, the erroneous image value of a faulty sensor element is replaced by the image value of the sensor element neighboring the faulty sensor element that comprises the least difference from the erroneous image value in terms of amount. Alternatively, the erroneous image value is replaced by the median value calculated from the image value of the faulty sensor element and from the image values of the sensor elements neighboring the faulty sensor element.

6 Claims, 2 Drawing Sheets

METHOD AND APPARATUS FOR IMAGE VALUE CORRECTION IN OPTOELECTRONIC TRANSDUCERS

BACKGROUND OF THE INVENTION

The invention is in the field of electronic reproduction technology and is directed to a method and to an apparatus for the correction of image values of malfunctioning sensor elements of an optoelectronic transducer comprising a plurality of sensor elements in the pixel-by-pixel and line-by-line scanning of originals. The optoelectronic transducer can, for example, be a photodiode line or a photodiode array.

In electronic reproduction technology, image values that represent the brightness values of the scanned pixels are acquired by pixel-by-pixel and line-by-line scanning of originals to be reproduced with optoelectronic scanner devices, also called scanners or image input devices, and are further-processed. The original to be scanned is arranged on an originals holder in an optoelectronic scanner device, this originals holder moving relative to a scanner unit. The scanner unit essentially comprises a light source for illuminating the original to be scanned, a plurality of optoelectronic transducers, for example in the form of a photodiode line (CCD line), and an objective for the line-by-line imaging of the original onto the photodiode line. A photodiode line is essentially composed of a plurality of light-sensitive sensor elements arranged in a row, of a transfer gate and of an analog shift register having a plurality of memory cells that corresponds to the plurality of light-sensitive sensor elements. The scan light coming from each scan line and modulated with the brightness values of the individual pixels is stored as charges in the light-sensitive sensor elements of the photodiode line, whereby one pixel of the scan line is allocated to each sensor element. After scanning a scan line, the stored charges are respectively transferred via the enabled transfer gate into the analog shift register and are serially shifted out of the latter as an analog image signal and is further-processed during the scanning of the next scan line.

In order to achieve a faultless scanning of the originals, and thus a good reproduction quality, the sensor elements of the photodiode line must, among other things, exhibit a linear behavior, i.e. the relationship between the brightness values of the pixels scanned in the original and the image values generated by the sensor elements of the photodiode line must be linear. Due to manufacturing faults, however, it can occur in practice that some sensor elements of a photodiode line are faulty and do not exhibit linear behavior, particularly given medium brightness values between "black" and "white". These deviations from linearity become visible in a reproduced original as disturbing streaks, particularly in areas having constant density and in density progressions.

In order to avoid such reproduction faults, the photodiode lines must either be selected—which would increase the price of photodiode lines—or a corresponding correction of the image values generated by the faulty sensor elements of the photodiode line must be implemented.

A method for image value correction in photodiode lines is already known wherein the image value of faulty sensor elements is respectively replaced by the arithmetic average formed from the image values of the immediately neighboring sensor elements, for which purpose the manufacturer must guarantee that two neighboring sensor elements are not faulty.

The afore-mentioned streak formation in areas of uniform density is in fact avoided in the known correction method; however, disturbances at light/dark transitions or at contours or edges that proceed obliquely relative to the direction of the expanse of the photodiode line, or relative to the scan direction, disadvantageously arise in the reproduced original.

SUMMARY OF THE INVENTION

It is an object of the present invention to improve the known method for the correction of image values of faulty sensor elements of optoelectronic transducers such that a faultless scanning, especially at light/dark transitions in the scanned original, and thus a good reproduction quality are achieved.

In the method and apparatus of the invention for correction of image values of faulty sensor elements of an optoelectronic transducer comprising a plurality of sensor elements, the image values are acquired by point-by-point and line-by-line optoelectronic scanning of an original with the sensor elements. An erroneous image value of a faulty sensor element is replaced by an image value calculated from image values of sensor elements neighboring the faulty sensor element. For avoiding errors at light/dark transitions in the scanner original, the erroneous image value of a faulty sensor element is fully corrected in areas of the original having nearly constant brightness values and is only relatively slightly corrected in regions of light/dark transitions in the original.

The invention is explained in detail below with reference to FIGS. 1 through 3.

BRIEF DESCRIPTION OF THE DRAWINGS

FIG. 2 is a graphic illustration for explaining the image value correction of the Prior Art; and FIG. 3 is a graphic illustration for explaining the image value correction of the invention.

DESCRIPTION OF THE PREFERRED EMBODIMENTS

Figure 1:
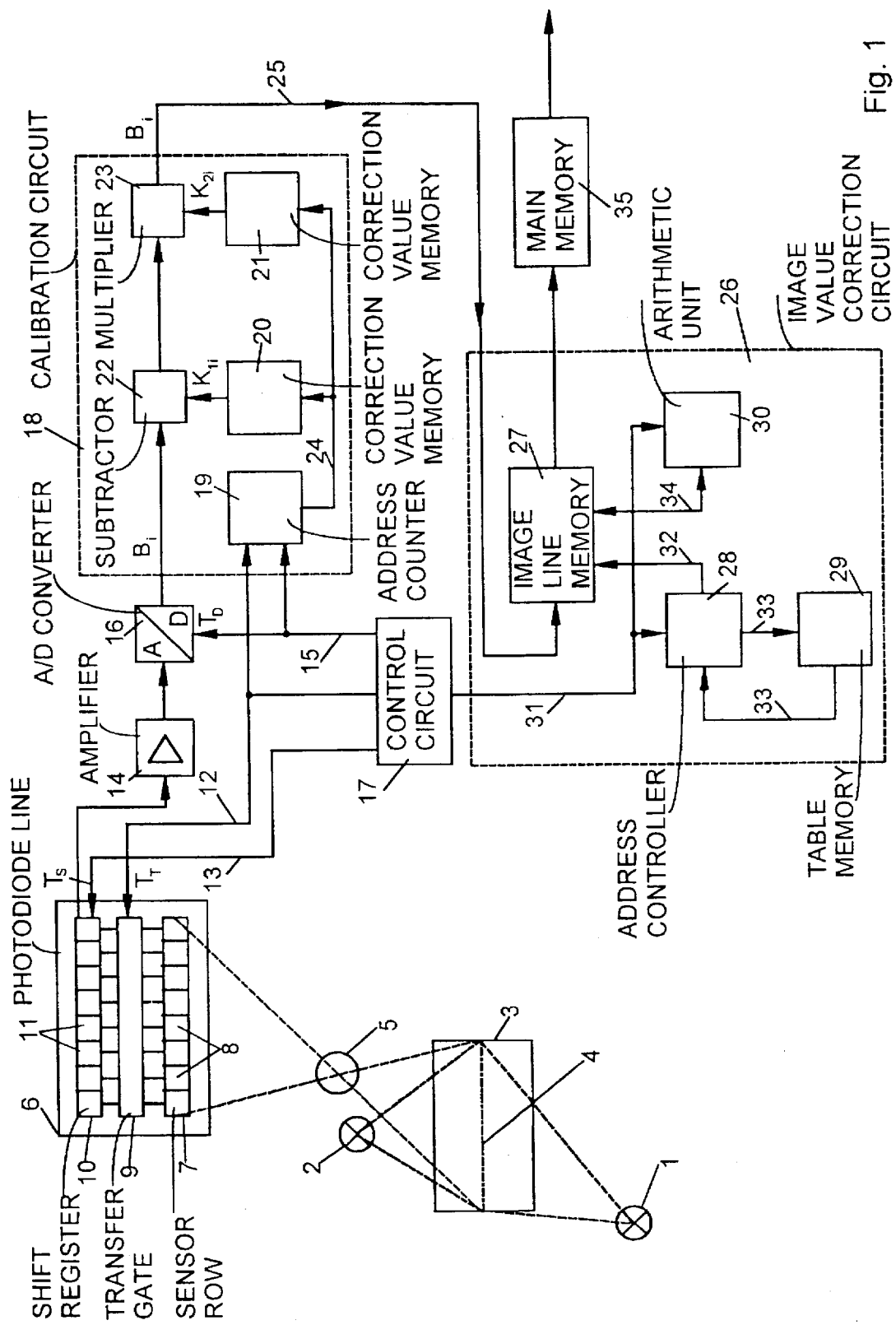
FIG. 1 is a schematic block circuit diagram of an optoelectronic scanner device with a photodiode line.

FIG. 1 shows a schematic block circuit diagram of an optoelectronic scanner device of the flatbed type for point-by-point and line-by-line scanning of black/white originals. A light source 1 for transparency scanning or a light source 2 for opaque scanning illuminates an original 3 secured on a planar originals holder (not shown) line-by-line with a relative motion between originals holder and light source 1,2. The scan lines 4 are successively imaged with an objective 5 onto the light sensitive surfaces of a plurality of optoelectronic transducers in the form of a photodiode line 6 or CCD line in the exemplary embodiment. Such a photodiode line 6 is essentially composed of a sensor row 7 having light-sensitive sensor elements 8 arranged side-by-side, of a transfer gate 9 and of an analog shift register 10 having a plurality of memory cells 11 that corresponds to the plurality of light-sensitive sensor elements 8 in the sensor row 7. For example, a typical photodiode line comprises 6000 sensor elements 8. The imaging scale of the objective 5 is selected such that the width of the original 3 is respectively imaged onto the sensor row 7, whereby one pixel of the scan line 4 is allocated to each light-sensitive sensor element 8. The scan light coming from the scan lines 4 of the original 3 and modulated with the brightness values of the individual pixels is stored as charges into the light-sensitive sensor elements 8 of the sensor row 7 within an integration time. After the integration time or after the scanning of a scan line, the charges stored in the light-sensitive sensor elements 8 of the sensor row 7 are transferred via the transfer gate 9 onto the allocated memory cells 11 of the shift register 10. For transferring the charges from the sensor row 7 into the shift register 10, the transfer gate 9 is enabled by a clock of a transfer clock sequence $T_T$ on a line 12. After the charge transfer, the charges are serially shifted out of the shift register 10 with a shift clock sequence $T_S$ on a line 13 as analog image signal values of the individual pixels of the currently scanned scan line 4 before the transfer of the information of the next scan line 4 into the shift register 10 begins. The analog image signal is amplified in an amplifier 14 and is digitized into image values in an A/D converter 16 clocked by a digitization clock sequence $T_D$ on a line 15.

Transfer clock sequence $T_T$, shift clock sequence $T_S$ and digitization clock sequence $T_D$ are generated in a control circuit 17.

The image values acquired in the A/D converter 16 are supplied to a calibration circuit 18 that is composed of an address counter 19, correction value memories 20, 21, a subtractor 22 and a multiplier 23. In the calibration circuit 18, the image values $B_i$ of the individual sensor elements are corrected to a standardized signal level for "black" (standardized black level) and to a standardized signal level for "white" (standardized white level) with corresponding correction values $K_{1i}$ and $K_{2i}$ for each sensor element. For adaptation of the individual black levels $SP_i$ of the individual sensor elements I to the standardized black level, the correction values $K_{1i}=SP_i$ identified for the corresponding sensor elements are respectively subtracted from the image values $B_i$ of the sensor elements I in the subtractor 22. For adaptation of the individual white level $WP_i$ of the individual sensor elements I to the standardized white level, the differences $(B_i-K_{1i})$ formed in the subtractor 22 are multiplied in the multiplier 23 by the corresponding correction values $K_{2i}=1/(WP_i-SP_i)$ in order to obtain the adapted image values $B_i^*$. The overall adaptation thus occurs according to the equation:

$$B_i^*=(B_i-K_{1i})\times K_{2i}.$$

The correction values $K_{1i}$ and $K_{2i}$ for the individual sensor elements 8 of the photodiode line 6 are calculated before the originals' scanning by scanning a reference black and a reference white and are callably stored for each sensor element 8 in the correction value memories 20, 21. The addresses I of the correction value memories 20, 21 belonging to the individual sensor elements I are called via an address bus 24 by the address counter 19 that is clocked by the digitization clock sequence $T_D$ on the line 15 and is reset by the transfer clock sequence $T_T$ on the line 12 after respectively scanning a scan line 4.

The image values adapted in the calibration circuit 18 proceed via a data bus 25 to an image value correction circuit 26 for the correction of the image values of the faulty sensor elements 8 of the photodiode line 6. The image value correction circuit 26 comprises an image line memory 27, an address controller 28, a table memory 29 and an arithmetic unit 30. The image line memory 27 can store 6000 image values of a scan line 4 corresponding to the exemplary 6000 sensor elements 8 of the photodiode line 6. Address controller 28 and arithmetic unit 30 are synchronized by the control unit 17 with a control signal on a line 31. Image line memory 27 and table memory 29 are addressed via the address busses 32, 33 proceeding from the address controller 28.

The identifiers of the faulty sensor elements 8 of the photodiode line 6 are stored as numbers between 1 and 60000 under the addresses 0 through 31 in the table memory 29. The numbers of the faulty sensor elements 8 are indicated by the manufacturer in the form of a specification list, whereby it is also specified that no more than 32 sensor elements 8 and no two neighboring sensor elements 8 dare be faulty. The faulty sensor elements 8 can also be identified by measurements when such a specification list from the manufacturer is not provided.

The image values of a scan line 4 are intermediately stored in the image line memory 27 under the addresses 0 through 5999 by corresponding addressing via the address bus 32. After the storing of the image values of the current scan line 4, the table memory 29 is interrogated address by address from 0 through 31 via the address bus 33, and the numbers of the faulty sensor elements 8 deposited under the interrogated addresses are communicated to the address controller 28 via a data bus 33. The address corresponding to the number of the first faulty sensor element 8 is first called in the image line memory 27 via the address bus 32, and the image value to be corrected that belongs to the first faulty sensor element 8 is written into the arithmetic unit 30 via a data bus 34 as central image value. At the same time, the current address of the image line memory 27 is incremented by "1" and deincremented by "1" and the image values of the neighboring, properly functioning sensor elements 8 deposited under the corresponding addresses are likewise written into the arithmetic unit 30 via the data bus 34.

In the arithmetic unit 30, the corrected image value for every faulty image value of a malfunctioning sensor element 8 is calculated from the respective central image value and/or from at least two image values neighboring in the scan line 4 or, on the other hand, is selected from at least two image values neighboring in the scan line 4.

In a first exemplary embodiment, that image value among the neighboring image values that has the least difference in terms of value from the image value to be corrected is respectively selected as a corrected image value.

In a second exemplary embodiment described in greater detail below, the median value from the three image values, namely the central image value and the two image values neighboring in the scan line 4, is respectively determined as a corrected image value. A median value derives by ordering numerical values in a series according to ascending value, whereby the median value is the middle numerical value of the series. A plurality of neighboring image values can also be utilized for forming the median value.

The corrected image value determined in the arithmetic unit 30, i.e. the selected image value or the median value, is then transferred via the data bus 34 to the image line memory 27, wherein the image value of the faulty sensor element 8 to be corrected is replaced by the corrected image value. The procedure is the same for all image values to be corrected in the scan line 4 currently intermediately stored in the image line memory 27. After the end of the correction, the image values of the current scan line 4 are read from the image line memory 27 and are transferred into a main memory 35 for further processing. Subsequently, the image values of the next scan line 4 are transferred from the shift register 10 of the photodiode line 6 into the image line memory 27, and the image values of the faulty sensor elements 8 are correspondingly corrected.

Following this description of the optoelectronic scanner device with the image value correction of the invention, the improvement over the prior art achieved, in particular, at light/dark transitions (edges, contours) shall be explained in greater detail for that case where the corrected image values are the median values.

Figures 2A, 2B, 3A, 3B:
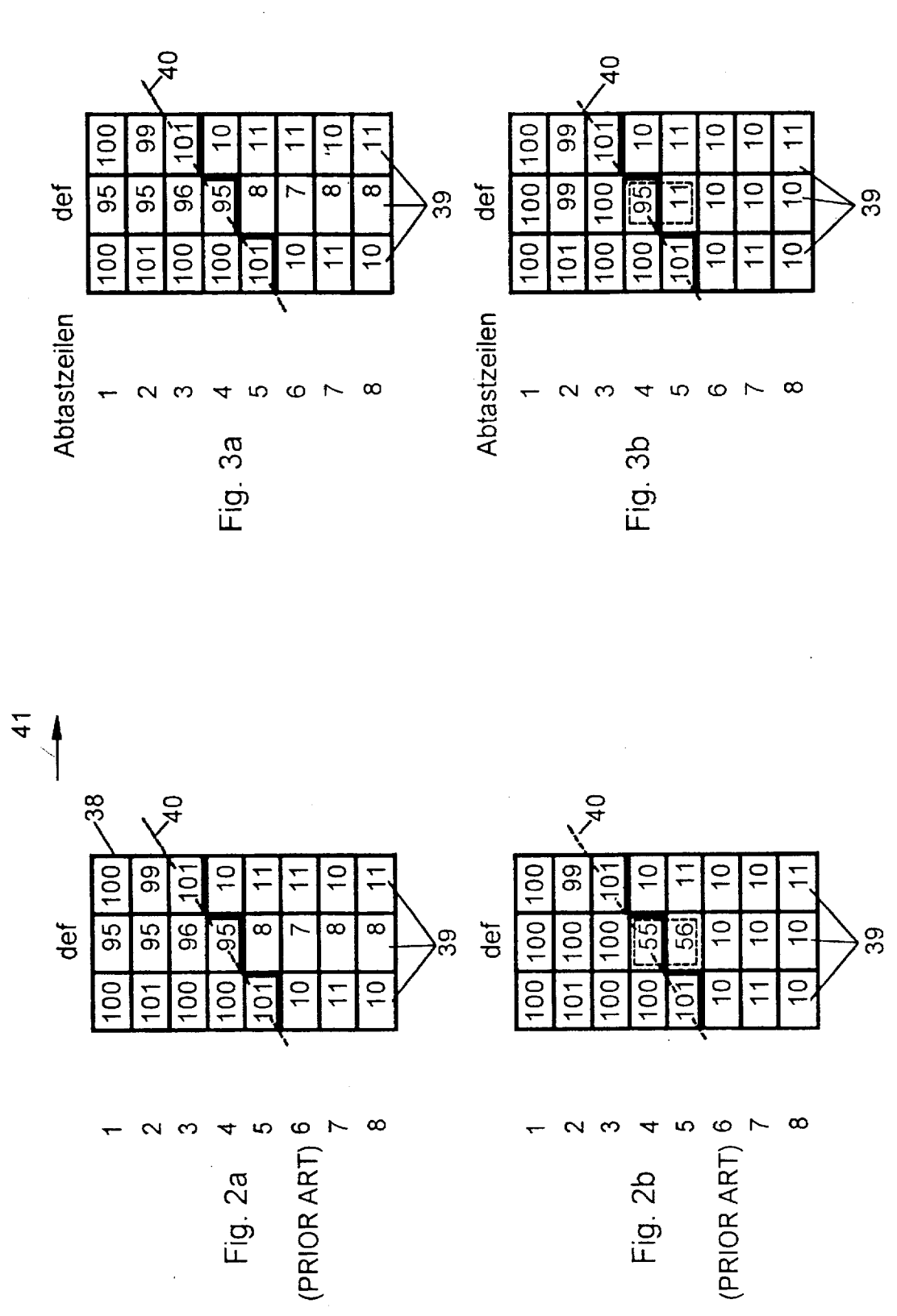

In a graphic illustration, FIG. 2a shows a field 38 of eight scan lines 4 having three pixels 39 each that are respectively scanned by three sensor elements 8 lying side-by-side in the photodiode line 6. Let the middle sensor element 8 have a non-linear behavior and, thus, be faulty. It is also assumed that a light/dark transition or a contour line 40 proceeds through the field 38 transversely relative to the direction 41 of the expanse of the photodiode line 6, whereby the pixels 39 lying on the one side of the contour line have nearly constant, high image values that correspond to high brightness values; and the pixels 39 lying on the other side of the contour line 40 comprise nearly constant, low image values that correspond to low brightness values. When scanning the pixels 39, the two sensor elements 8 that are not faulty supply, for example, the image values "10" and "11" or, respectively, "99", "100" and "101"; by contrast, the faulty sensor element that supplies, for example, the image values "7" and "8" or "95" and "96", must be corrected.

In a graphic illustration, FIG. 2b shows the result of the image value correction of the prior art, whereby the image values generated by the faulty sensor element 8 are respectively replaced by the arithmetic average of the neighboring image values in the corresponding scan line 4. It may be seen from the illustration that the image values of the faulty sensor element 8 are correctly corrected in the uniform areas but not in the region of the contour line 40. Here, the image value "95" is corrected into the image value "55" and the image value "8" is corrected into the image value "56". The falsified image values "55" and "56", which correspond to average brightness values, deviate substantially from the average correct image values "10" or "100". Unacceptable disturbances thus arise in reproduced originals according to the prior art, especially at light/dark transitions.

These disturbances at light/dark transitions are advantageously eliminated by the techniques of the invention, as shown in FIG. 3.

In a graphic illustration like FIG. 2a, FIG. 3a shows the initial situation before the image value correction of the invention.

In a graphic illustration, FIG. 3b shows the result after the image value correction of the invention, whereby the image value generated by the faulty sensor element is respectively replaced by the median value of the three image values lying next to one another in the corresponding scan line 4. It may be seen from this illustration that the image values "95" and "8" of the faulty sensor element 8 in the region of the contour line are now corrected into the image values "95" and "11" by the image value correction of the invention. As a result thereof, the corrected image values comprise significantly less deviation from the average correct image values "10" and "100", disturbances at light/dark transitions being thus capable of being advantageously reduced to such an extent that they can no longer be perceived as disturbing by the human eye.

It may be seen from the illustrations of FIGS. 2 and 3 that the method of the invention fully corrects the image values of the faulty sensor elements 8 only in uniform areas of constant or nearly constant brightness, whereas the image values in the region of light/dark transitions deviate only slightly after correction from the original, uncorrected image values. The disturbing streak formation is nearly completely avoided by the full image value correction in uniform areas, whereas the image value deviations at the light/dark transitions are so slight that the human eye no longer perceives them to be disturbing.

It lies within the scope of the invention to apply the method for image correction both given photodiode lines as well as photodiode arrays for black/white scanning or for color scanning.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for correction of image values of faulty sensor elements of an optoelectronic transducer comprising a plurality of sensor elements, comprising the steps of:

acquiring the image values by point-by-point and line-by-line optoelectronic scanning of an original with the sensor elements;

intermediately storing the image values scanned in the original scan line-by-scan line for image value correction in an image line memory that has a number of memory locations at least corresponding to a number of the sensor elements of the optoelectronic transducer;

allocating an identifier to each sensor element of the optoelectronic transducer;

callably storing the identifiers allocated to the faulty sensor elements in a table memory;

replacing an erroneous image value of a faulty sensor element by an image value calculated from image values of sensor elements neighboring the faulty sensor element; and for avoiding errors at light/dark transitions in the scanned original, the erroneous image value of the faulty sensor element is fully corrected in areas of the original having nearly constant brightness values and is only relatively slightly corrected in regions of light/dark transitions in the original.

2. A method according to claim 1 including the steps of:

intermediately storing the image values of a scan line scanned in the original in the image line memory under addresses corresponding to the allocated identifiers;

successively calling the identifiers of the faulty sensor elements stored in the table memory;

calling a central address corresponding to a corresponding identifier and neighboring addresses of the image line memory for each called identifier of a faulty sensor element;

respectively calculating a corrected image value from the image values deposited under the called addresses of the image line memory; and respectively replacing the faulty image value deposited under the central address by the corrected image value.

3. A method for correction of image values of faulty sensor elements of an optoelectronic transducer having a plurality of sensor elements, comprising the steps of:

acquiring the image values by scanning the original with the sensor elements; and avoiding errors at light/dark transitions in the scanned original by replacing an erroneous image value of a faulty sensor element by an image value selected according to the following steps:

identifying the image value of the sensor element lying at one side of the faulty sensor element and identifying the image value lying at the sensor element at the opposite side of the faulty sensor element;

making an ordered list of the two neighboring sensor element image values and the image value of the faulty sensor element according to value; and identifying a median image value in the ordered list and replacing the image value of the faulty sensor element with the median image value.

4. An apparatus for correction of erroneous image values of faulty sensor elements of an optoelectronic transducer, comprising:

an optoelectronic transducer comprising a plurality of sensor elements for point-by-point and line-by-line optoelectronic scanning of an original;

an A/D converter connected to the optoelectronic transducer;

an image value correction circuit connected to the A/D converter for the correction of the erroneous image values of the faulty sensor elements;

the image value correction circuit having:

an image line memory for line-by-line intermediate storage of image values of sensor elements of the optoelectronic transducer at addresses that correspond to identifiers allocated to the sensor elements;

a table memory for callably storing the identifiers allocated to the faulty sensor elements;

an address controller connected to the image line memory and to the table memory for calling the identifiers of the faulty sensor elements stored in the table memory and for calling central addresses corresponding to the identifiers called in the table memory and respective neighboring addresses of the image line sensor; and an arithmetic unit connected to the image line memory for calculating corrected image values from the image values respectively deposited under the called addresses of the image line memory.

5. An apparatus according to claim 4 wherein the optoelectronic transducer is a photodiode line.

6. An apparatus according to claim 4 wherein the optoelectronic transducer is a photodiode array.

* * * * *